United States Patent Office 3,658,844
Patented Apr. 25, 1972

3,658,844
SUBSTITUTED 1,3-DITHIAN-5-ONES
William Lindsay Mosby, North Plainfield, N.J., assignor to American Cyanamid Company, Stamford, Conn.
No Drawing. Filed July 2, 1970, Ser. No. 52,128
Int. Cl. C07d 73/00; A61k 27/00
U.S. Cl. 260—327 M          7 Claims

ABSTRACT OF THE DISCLOSURE

Novel substituted 1,3-dithian-5-ones of the formula:

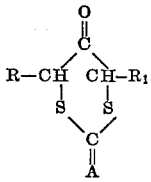

wherein R and $R_1$ are members selected from the group consisting of hydrogen and lower alkyl; A is a member of the group consisting of:

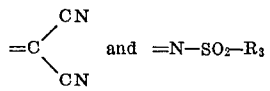

and $R_3$ can be the phenyl, tolyl or naphthyl radical. These compounds are useful as bactericides, fungicides and herbicides.

Generally stated the subject matter of the patent invention relates to a new class of heterocyclic compounds, and to a process for their preparation. In addition, the invention relates to bactericidal and fungicidal compositions comprising such compounds, as well as to a method for controlling such undesirable plant life.

More particularly, this invention relates to a new class of 1,3-dithiane derivatives. The 1,3-dithiane has the following formula:

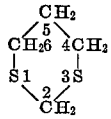

in which the numbers within the ring correspond to numbers assigned to the annular atoms. The 1,3-dithiane is also known as m-dithiane,1,3-dithiacyclohexane and tetramethylene 1,3-disulfide. (See Ring Index, Patterson and Capell, 1940.)

Even more particularly, the compounds of the present invention are directed to substituted 1,3-dithian-5-ones having the formula:

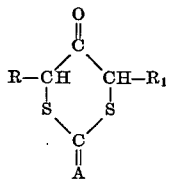

wherein R and $R_1$ are members selected from the group consisting of hydrogen and lower alkyl; A is a member of the group consisting of:

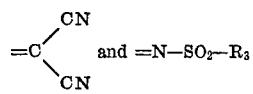

and $R_3$ is a member of the group consisting of phenyl, tolyl and naphthyl radicals.

The compounds of the present invention are biocidal in nature. More particularly they demonstrate herbicidal activity towards a variety of plants. Compositions containing these compounds have been found to be effective as post-emergence herbicides.

In addition, the substituted 1,3-dithian-5-ones herein described possess useful anti-fungal and anti-bacterial activity. These compounds are effective against a large number of fungi which are saprophytic in nature and which cause physical decay, resulting in the spoilage of foods. Furthermore, some of these fungi are pathogenic to both plants and animals.

In general, the compounds of the present invention are buff to yellow colored solids which are insoluble in water and which are soluble in organic solvents such as benzene, alcohol and acetonitrile.

Typical compounds which may be prepared by the process of the present invention include the following:

2-dicyanomethylene-4-methyl-1,3-dithian-5-one,
2-dicyanomethylene-4,6-dimethyl-1,3-dithian-5-one,
2-dicyanomethylene-4-ethyl-1,3-dithian-5-one,
2-dicyanomethylene-4,6-dibutyl-1,3-dithian-5-one,
2-phenylsulfonylimino-1,3-dithian-5-one,
2-phenylsulfonylimino-4-methyl-1,3-dithian-5-one,
2-phenylsulfonylimino-4,6-diethyl-1,3-dithian-5-one,
2-phenylsulfonylimino-4-isopropyl-1,3-dithian-5-one,
2-p-tolylsulfonylimino-1,3-dithian-5-one,
2-p-tolylsulfonylimino-4-ethyl-1,3-dithian-5-one,
2-p-tolylsulfonylimino-4,6-dipropyl-1,3-dithian-5-one,
2-p-tolylsulfonylimino-4-butyl-1,3-dithian-5-one,
2-naphthylsulfonylimino-4-propyl-1,3-dithian-5-one,
2-naphthylsulfonylimino-4,6-dimethyl-1,3-dithian-5-one, and
2-naphthylsulfonylimino-4-butyl-1,3-dithian-5-one.

These compounds can be prepared by reacting approximately equimolecular proportions of a dihaloketone with a dialkali metal salt of a substituted dimercaptomethylenemalonitrile in an appropriate solvent. This reaction may be represented empirically as follows:

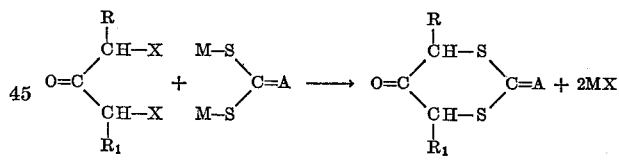

wherein R, $R_1$ and $R_3$ are as previously described and M is an alkali metal, such as sodium and potassium, and X is a halogen, such as chloro and bromo.

In general, the reaction is carried out in a solvent which is inert with respect to both the starting materials and the final product. Dimethylformamide and acetonitrile are considered to be the solvents of choice.

Approximately equimolecular amounts of the reactants are used, although it is advantageous to use a slight excess of the di-alkali metal salt of dithioimidocarbonic acid or the dimercaptomethylenemalonitrile, whichever is being used. The reaction proceeds smoothly at ambient temperatures and within a reasonable period of time ranging from several minutes to about an hour. If desired, temperatures above room temperature may be employed to facilitate a completion of the reaction. The use of temperatures below room temperature may also be conveniently employed in order to control the rate of reaction—an increase in temperature results in an increased rate of reaction, whereas a decrease in temperature causes the reaction to proceed much more slowly at a controlled rate.

Illustrative of the dihaloketones which may be employed as starting materials are 1,3-dichloro-2-propanone, 1,3 - dibromo-2-propanone, 1,3-dichloro-2-butanone, 1,3-dibromo-3-butanone, 1-bromo-3-chloro-2-butanone, 1,3-dibromo - 2-pentanone, 2,4-dibromo-3-pentanone, 1,3-dibromo-2-nonanone. These compounds are obtained by well known procedures such as halogenation of the corresponding ketones or by the oxidation of the corresponding halogenated alcohols.

Where the 2-dicyanomethylene derivatives of 1,3-dithian-5-ones are the desired products, the alkali metal salts of 1,1-dimercapto-2,2-dicyanoethylene are reacted with the above mentioned dihaloketones. The disodium and dipotassium salts of 1,1-dimercapto-2,2-dicyanoethylene are particularly useful and may be prepared by the reaction of carbon disulfide with malononitrile. Typical reaction conditions for their preparation are described in U.S. Pat. No. 3,057,875.

Where the aryl substituted sulfonylimino-1,3-dithian-5-ones are desired, the above mentioned dihaloketones are reacted with alkali metal salts of aryl substituted sulfonyldithioimidocarbonates. Exemplary among these compounds are disodium phenylsulfonyldithioimidocarbonate, dipotassium tolylsulfonyldithioimidocarbonate and dipotassium 2-naphthylsulfonyldithioimidocarbonate. These compounds can be prepared by the procedure described in Angew. Chem. 74, 753 (1962).

A further object of the present invention is the preparation of compositions which can be formulated as emulsifiable liquid concentrates useful as herbicides in controlling undesirable plants. These compositions may be beneficially employed in areas to suppress unwanted vegetation, as for example, along railroad tracks, industrial sites and gas and oil tank farms.

Liquid compositions may be prepared by dissolving the compounds in a variety of organic solvents. The resulting solutions are subsequently admixed with water, either with or without an emulsifying agent. Exemplary of the organic solvents which may be so employed are: acetone, methyl isobutyl ketone, dioxane, isopropyl acetate, ethanol, benzene, xylene, dimethyl sulfoxide, dimethylformamide, the nitroparaffins, cyclohexanone, aromatic naphthas, and their equivalents.

Surface active agents or emulsifiers which can be employed are those normally employed in the preparation of oil-water emulsions. They may either be ionic or non-ionic in nature. Representative of such emulsifying agents are: the higher alkyl aryl sulfontes, polyoxyethylene esters, polyglycol ethers, and sodium dioctylsulfosuccinate. The emulsifying agents are employed in low concentrations, generally in the range of from about 0.1 percent to about 2 percent by weight of the total weight of sprayable emulsion.

The compounds of the present invention also lend themselves to the formation of herbicidal dusts, granules and wettable powders. These formulations are readily prepared by blending the desired compound to be employed with a solid carrier. Alternatively, the compound may be dissolved in a suitable solvent and added to the carrier in the form of a spray or solution by any of the conventional and well recognized procedures. Illustrative of the solid carriers which may be employed are: talc, clay, pumice, walnut shell flour, chalk, diatomaceous earth and vermiculite. Small amounts of emulsifiers or wetting agents may also be added to such formulations in order to assist their uniform dispersibility into the carrier.

The quantity of the substituted 1,3-dithian-5-one employed in such herbicidal compositions as described will vary both in the manner and for the purpose for which the composition is to be employed. Concentrated spray solutions may contain as much as 90 percent or more by weight of the active ingredient. Sprays, dusts or wettable powders for direct application to vegetation will be much more dilute, e.g., the active ingredient is present in a concentration of from about 0.2 percent to as high as 10 percent by weight.

The following examples are presented to further illustrate the present invention. Unless otherwise noted, all parts are by weight.

EXAMPLE I

A mixture of 11.0 parts dipotassium salt of dimericaptomethylenemalonitrile and 6.3 parts of 1,3-dichloro-2-propanone in 25 parts, by volume, of acetonitrile is triturated for several minutes at room temperature. External cooling is supplied to maintain approximately room temperature. Upon the addition of water, a precipitate is obtained. The precipitate is separated, washed with water, methanol and ligroin and dried. Upon crystallization from benzene, 2-dicyanomethylene - 1,3 - dithian-5-one is obtained as a yellow product which melts at 150–152°.

TABLE 1

| | Carbon | Hydrogen | Nitrogen | Oxygen | Sulfur |
|---|---|---|---|---|---|
| Calculated for $C_{11}H_{11}NOS$ | 43.9 | 3.65 | 4.65 | 15.9 | 31.9 |
| Found | 43.8 | 3.8 | 4.37 | 15.8 | 32.0 |

EXAMPLE II

Repeating the procedure of Example 1, but substituting an equivalent amount of 2,4-dibromo-3-pentanone for the 1,3-dichloro-2-propanone results in the preparation of 2 - dicyanomethylene - 4,6-dimethyl-1,3-dithian-4-one in good yield.

EXAMPLE III

The procedure of Example 1 is followed, substituting equivalent amounts of the disodium salt of dimercaptomethylenemalononitrile for the dipotassium salt of dimercaptomethylenemalononitrile and 1,3 - dibromo-2-nonanone for the 1,3-dichloro-2-propanone. The product 2-dicyanomethylene-4-hexyl-1,3-dithian-5-one is obtained.

EXAMPLE IV

To a solution of 6.35 parts of 1,3-dichloro-2-propane in 10 parts, by volume, of acetonitrile is slowly added a solution of 18.0 parts of dipotassium p-tolylsulfonyldithioimidocarbonate in 50 parts, by volume, of acetonitrile. Upon addition of water, a precipitate is obtained which is filtered, washed with water, dried and triturated with glacial acetic acid. 2-p-tolylsulfonylimino-1,3-dithian-5-one is obtained as a pale yellow crystalline product which melts instantaneously at about 120° C. with decomposition.

EXAMPLE V

Repeating the procedure of Example 4, but substituting an equivalent amount of 1,3-dibromo-2-butanone for the 1,3-dichloro-2-propanone and an equivalent amount of dipotassium phenylsulfonyldithioimidocarbonate results in the preparation of 2 - phenylsulfonylimino - 4 - methyl-1,3-dithian-5-one.

EXAMPLE VI

The procedure of Example 4 is followed substituting equivalent amounts of 3,5-dichloro-4-hexanone for the 1,3-dichloro-2-propanone and disodium naphthylsufonyldithioimidocarbonate for the dipotassium p-tolylsulfonyldithioimidocarbonate. The product, 2-naphthylsulfonylimino-4-methyl-6-ethyl-1,3-dithian-5-one, is obtained.

EXAMPLE VII

The antifungal and antibacterial activities of 2-dicyanomethylene - 1,3 - dithian - 5 - one and 2 - p - tolylsulfonylimino-1,3-dithian-5-one are measured by a standard microbiological assay procedure, i.e., by a standard dilution method. Standard sterile nutrient agar solutions, containing different dilutions of a solution containing 2.5 mg. of test compound per ml. of solution, are allowed to cool in a petri dish, thereby forming solidified agar plates. Suitable control solutions are also employed. Suspension of the test organisms are streaked on the agar plates and the plates are incubated. The plates are examined, and the minimal concentration of the test compound causing complete inhibition of microbial growth is noted. The results are shown in the table below.

TABLE 2

| | Minimal inhibitory concentration (mgc./ml.) | |
|---|---|---|
| | Compound A [1] | Compound B [2] |
| Fungi: | | |
| Saccharomyces cerevisiae | 250 | 250 |
| Mucor ramannianus | 250 | |
| Fusarium spisphaeria | 250 | 125 |
| Trichophyton mentagrophytes | 125 | 31 |
| Microsporum gypseum | 250 | 125 |
| Penicillium digitatum | | 250 |
| Memnoniella echinata | 250 | 250 |
| Chaetomium globosum | 250 | 250 |
| Bacterium, Mycobacterium smegmates | 250 | |

[1] 2-dicyanomethylene-1,3-dithian-5-one.
[2] 2-p-tolylsulfonylimino-1,3-dithian-5-one.

EXAMPLE VIII

A herbicidal dust is prepared by dissolving 1 part of 2-dicyanomethylene-1,3-dithian-5-one in 20 parts of an aqueous methyl isobutyl ketone solution. Five parts of this solution are added to 25 parts of ground walnut shell flour, and the mixture blended and dried. The resulting herbicidal composition is useful as a dust for direct application to leaves of unwanted plants or to the area to be protected from undesirable plant growth.

EXAMPLE IX

A liquid concentrate is prepared by dissolving 1 part of 2-p-tolylsulfonylimino-1,3-dithian-5-one in 10 parts of dimethylformamide. To the solution is added 0.1 part of sodium dioctyl sulfosuccinate to act as an emulsifying agent. A mixture of one part of this concentrate in 20 parts of water is found to be an effective herbicidal solution when employed as a spray on the leaves of undesirable plants such as crabgrass, barnyard grass and pigweed.

EXAMPLE X

The post-emergence herbicidal effectiveness of 2-dicyanomethylene-1,3-dithian-5-one is measured by preparing various concentrations of the compound in a 50 percent aqueous-acetone solution. The active compound is applied as a spray to a variety of species of two-week old plants in a sufficient quantity so as to provide the equivalent of about 10 pounds per acre of the active herbicidal compound. The treated plants are then placed in greenhouse benches, and the results are observed and recorded two weeks later. Plants such as lambs' quarter, mustard, barnyard grass, crabgrass, tomato and radish are injured thereby showing the herbitoxic effect of the compound on these plants.

What is claimed:
1. A compound having the formula:

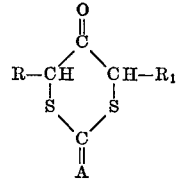

wherein R and $R_1$ are members selected from the group consisting of hydrogen and lower alkyl; A is a member of the group consisting of:

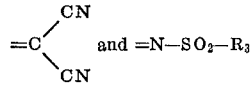

and $R_3$ is a member of the group consisting of phenyl, tolyl and naphthyl radicals.

2. The compound 2-dicyanomethylene-1,3-dithian-5-one.

3. The compound 2-dicyanomethylene-4,6-dimethyl-1,3-dithian-5-one.

4. The compound 2-dicyanomethylene-4-hexyl-1,3-dithian-5-one.

5. The compound 2-p-tolylsulfonylimino-1,3-dithian-5-one.

6. The compound 2-phenysulfonylimino-4-methyl-1,3-dithian-5-one.

7. The compound 2-naphthylsulfonylimino-4,6-diethyl-1,3-dithian-5-one.

References Cited

UNITED STATES PATENTS

| 3,057,875 | 10/1962 | Brown | 260—327 |
| 3,424,764 | 1/1969 | Mosby | 260—327 |
| 3,429,895 | 2/1969 | Mosby | 260—327 |

HENRY R. JILES, Primary Examiner

C. M. SHURKO, Assistant Examiner

U.S. Cl. X.R.

71—90; 424—277